(12) United States Patent
Shiozaki et al.

(10) Patent No.: US 10,540,609 B2
(45) Date of Patent: Jan. 21, 2020

(54) PREDICTION DEVICE, PREDICTION METHOD, AND RECORDING MEDIUM

(71) Applicant: CANON KABUSHIKI KAISHA, Tokyo (JP)

(72) Inventors: Hiromi Shiozaki, Yokohama (JP); Atsushi Nogami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 14/948,838

(22) Filed: Nov. 23, 2015

(65) Prior Publication Data

US 2016/0155056 A1 Jun. 2, 2016

(30) Foreign Application Priority Data

Nov. 28, 2014 (JP) ................. 2014-242460

(51) Int. Cl.
*G06N 5/02* (2006.01)
*G06N 20/00* (2019.01)
(52) U.S. Cl.
CPC ............... *G06N 20/00* (2019.01); *G06N 5/02* (2013.01)

(58) Field of Classification Search
None
See application file for complete search history.

(56) References Cited

FOREIGN PATENT DOCUMENTS

JP 7-306846 A 11/1995

OTHER PUBLICATIONS

Ting, et al., Automatic Outlier Detection: A Bayesian Approach, 2007 IEEE International Conference on Robotics and Automation, 2007, pp. 2489-2494 (Year: 2007).*
Bishop, C.M., "Pattern Recognition and Machine Learning", Information Science and Statistics, 3.1 Linear Basis Function Models, 2006, pp. 138-147.

* cited by examiner

Primary Examiner — Wilbert L Starks
(74) Attorney, Agent, or Firm — Canon U.S.A., Inc., IP Division

(57) ABSTRACT

To precisely predict future data even when the number of pieces of time-series data is small, in predicting the future data, using the time-series data. When the future data is predicted using the time-series data, whether present time data is used is determined based on prediction variation or a data transition, and then the prediction of the future data is performed.

15 Claims, 10 Drawing Sheets

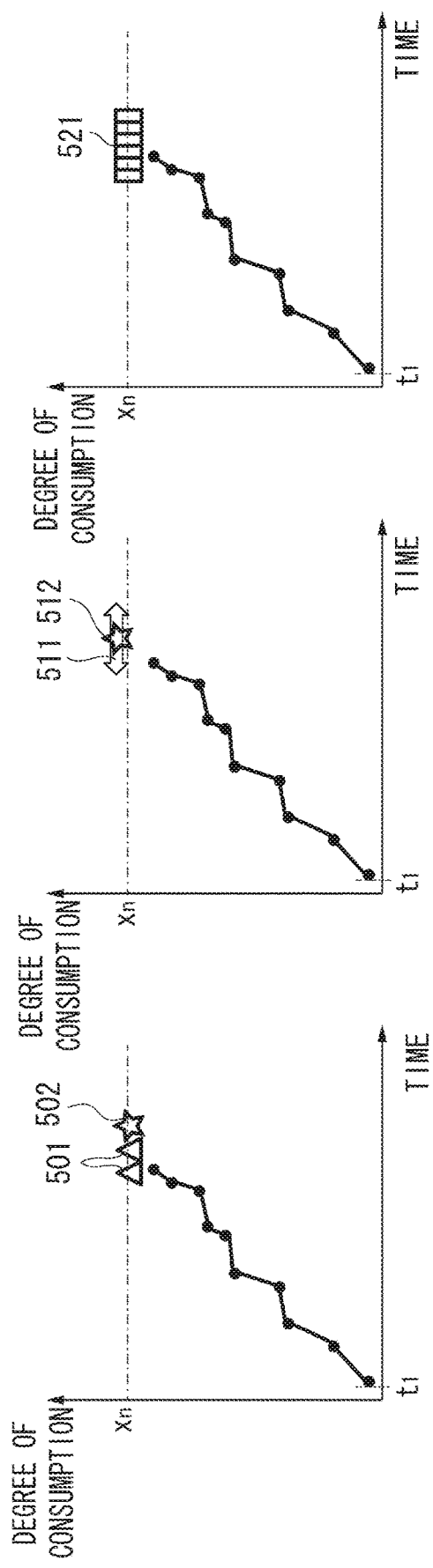

PREDICTION DEVICE, PREDICTION METHOD, AND RECORDING MEDIUM

BACKGROUND OF THE INVENTION

Field of the Invention

The present invention relates to a technology for predicting future data, using time-series data.

Description of the Related Art

Conventionally, many methods for predicting data that would be acquired in the future, using past and present time-series data, have been discussed. However, when an outlier value is included in acquired data, a prediction result may be deteriorated due to use of the data. Japanese Patent Application Laid-Open No. 7-306846 describes a method for storing a difference of an actual value from a prediction value, as a prediction error, considering the present actual value, as an abnormal value, when a large prediction error occurs, and replacing the actual value with the prediction value to perform future prediction.

However, in the method of Japanese Patent Application Laid-Open No. 7-306846, data of the actual value considered as an abnormal value is replaced with the prediction value, and is not used in subsequent prediction. However, when only a limited number of pieces of time-series data can be acquired, if the actual value considered as the abnormal value is replaced with the prediction value, like the method of Japanese Patent Application Laid-Open No. 7-306846, the number of pieces of data of actual values that can be used in prediction becomes small, and precision of the prediction may be decreased.

SUMMARY OF THE INVENTION

According to an aspect of the present invention, a prediction device includes a data acquisition unit configured to acquire present time data, a data generation unit configured to generate time-series data from the data acquired by the data acquisition unit at plurality of times, a determination unit configured to determine whether the generated time-series data satisfies a predetermined condition, and a final prediction unit configured to predict future data, based on past time data without using the present time data, when the predetermined condition is determined to be satisfied, and to predict the future data, based on the present time data and the past time data, when the predetermined condition is determined not to be satisfied, wherein past time data is previously acquired present time data which has been acquired prior to the present time data.

Further features of the present invention will become apparent from the following description of exemplary embodiments with reference to the attached drawings.

BRIEF DESCRIPTION OF THE DRAWINGS

FIGS. 5A to 5C are diagrams illustrating display examples of prediction results in the first exemplary embodiment.

DESCRIPTION OF THE EMBODIMENTS

Application Embodiment

Figure 1:
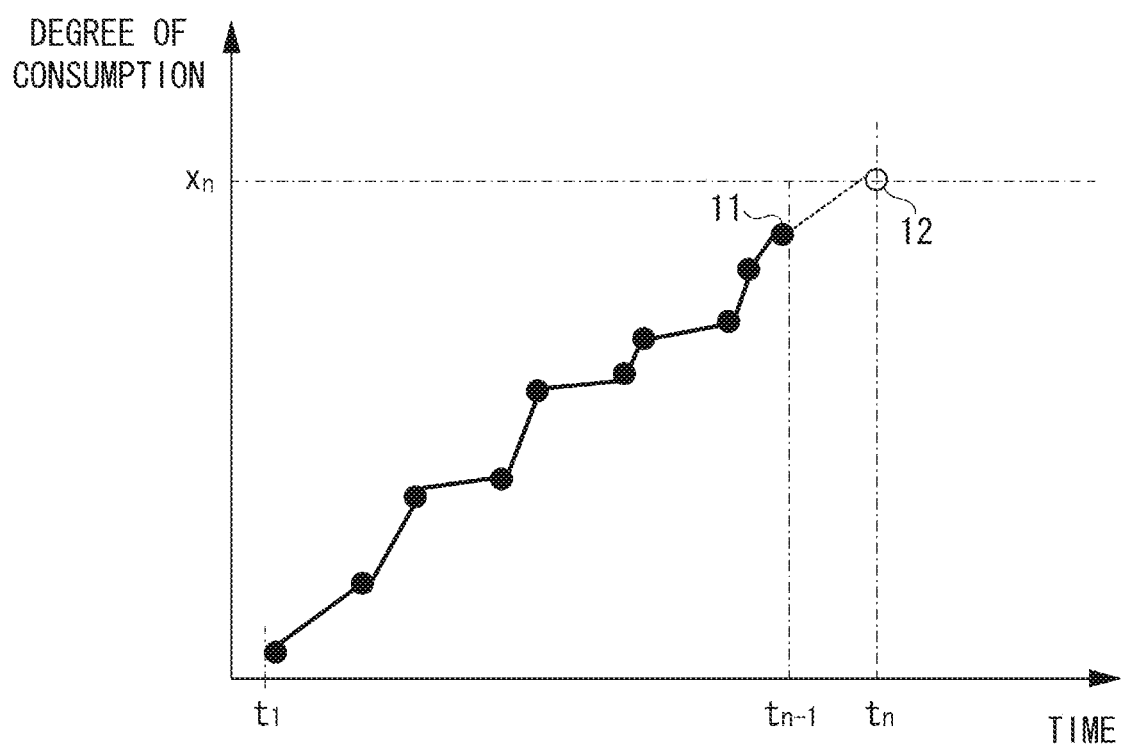
FIG. 1 is a diagram illustrating an example of time-series data acquired in a first exemplary embodiment.

A first exemplary embodiment will be described. Time-series data handled by a prediction device according to an exemplary embodiment of the present invention is, for example, data obtained such that consumption, the degree of deterioration, a possibility of occurrence of failure, and the like about components that constitute various products such as a printer, a copy machine, a camera, or a vehicle are acquired and calculated from a sensor or a counter, and recorded with passage of time. The prediction device of the present exemplary embodiment predicts a time to replace the component, and the like, based on the time-series data.

For example, in a case of replacement of toner of a copy machine, a remaining amount of the toner is sequentially acquired with a sensor, and a time when the toner is exhausted (time to replace the toner) is predicted from the time-series data of the acquired remaining amount of the toner. The time when the toner is exhausted may be predicted by date, or may be predicted by the remaining number of days until when the toner is exhausted. Any information may be used as long as the information is about the time when the toner is exhausted (time to replace the toner). In the case of replacement of toner of a copy machine, the number of printable sheets (count value) by the time when the toner is exhausted may be used.

In a case of replacement of a drum of a copy machine, similarly, data about consumption of the drum is sequentially acquired with the sensor, and the time-series data is obtained. The time-series data acquired at this time may be data such as a print area, a charge application time, and the like, which is about the consumption, rather than the data that directly indicates the consumption. Alternatively, a probability of occurrence of failure is calculated based on the information obtained from the sensor and the like, and time-series change of the probability of occurrence of failure may be recorded as the time-series data. The prediction device of the present exemplary embodiment can sequentially acquire the data, and predict the time to replace the drum.

Further, as another case, a case of replacement of a tire of a vehicle, the degree of consumption of the tire, for example, a depth of a groove is measured, and is sequentially recorded with a travelled distance, and a replacement time is predicted. A prediction result of consumption, reaching the end of life, or occurrence of failure can be used in effective maintenance. For example, when reaching the end of life of the toner or the drum is predicted, a user or a service person of the copy machine can prepare stock of the toner or the drum in advance. Further, the service person can visit the copy machine before the toner or drum reaches the end of life, and can create a plan to replace the components. By use of the prediction result as described above, occurrence of downtime of the copy machine is suppressed, and dispatch efficiency of the service person can be improved.

As another application case, a case of sequentially recording a traveling section and a traveling time of a vehicle as the time-series data, and predicting a necessary time to a destination can be considered. Further, an application is not limited to an object, and the prediction can be applied to weather forecast, or the like. An exemplary embodiment of acquiring the amount of rain and the temperature with a sensor, and predicting a time when the rain becomes heaviest can be considered.

In the description below, a case of prediction of replacement of toner of a copy machine will be exemplarily described. However, the prediction device according to the present exemplary embodiment is not limited to the example. An application embodiment described here is an example, and the prediction device according to the present exemplary embodiment can be applied to various exemplary embodiments as long as the prediction device performs prediction, using time-series data.

(Outline)

FIG. 1 illustrates an example of the time-series data acquired in the present exemplary embodiment. The present exemplary embodiment predicts a time to replace toner in a copy machine, and the acquired time-series data is the degree of consumption (for example, the toner remaining amount or the like) represented on the vertical axis, to a time t represented on the horizontal axis.

The prediction device according to the present exemplary embodiment predicts a future value, using the time-series data from a time $t_1$ to a time $t_{n-1}$ when the time-series data is provided like FIG. 1. In the case of FIG. 1, the prediction device predicts a time $[t_n]$ at which the degree of consumption would become a value $x_n$ set in advance, using data of the degree of consumption that can be acquired in time series. At this time, when data 11 of the time $t_{n-1}$ is an outlier value, the value exerts significant influence on the prediction, and precision of predicted future data 12 may often be deteriorated. In the description of the present exemplary embodiment, a true value and the prediction value are used differently, where the true value is $t_n$, and the prediction value is $[t_n]$. Therefore, in the present exemplary embodiment, the time $[t_n]$ at which the degree of consumption would become the value $x_n$ set in advance is predicted using magnitude of variation of the prediction.

Figure 2:
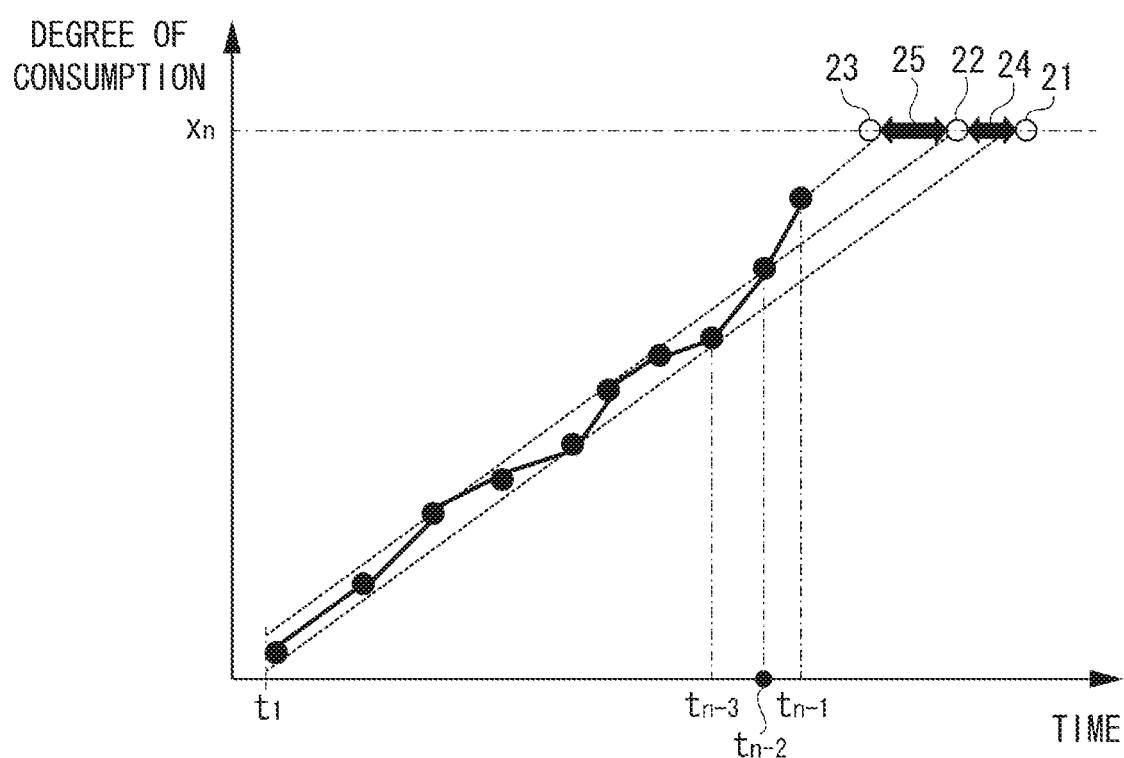
FIG. 2 is a diagram for describing an outline of a prediction method according to the first exemplary embodiment.

FIG. 2 is a diagram for describing a prediction method in the present exemplary embodiment. In FIG. 2, data 21 is prediction of the time $[t_n]$ at which the degree of consumption would become the value $x_n$, using data from the time $t_1$ to a time $t_{n-3}$. Similarly, data 22 is prediction of the time $[t_n]$ at which the degree of consumption would become the value $x_n$, using data from the time $t_1$ to a time $t_{n-2}$. Similarly, data 23 is prediction of the time $[t_n]$ at which the degree of consumption would become the value $x_n$, using data from the time $t_1$ to a time $t_{n-1}$.

Past time prediction variation 24 is a difference between the respective predicted times $[t_n]$ predicted in the time $t_{n-3}$ and the time $t_{n-2}$. Similarly, present time prediction variation 25 is a difference between the respective predicted times $[t_n]$ predicted in the time $t_{n-2}$ and the time $t_{n-1}$. In the present exemplary embodiment, when the present time prediction variation 25 is larger than the past time prediction variation 24, the prediction is performed without using the data of the present time $t_{n-1}$, based on an idea that the prediction precision becomes high if the data of the present time $t_{n-1}$ is not used.

(Configuration)

Figure 3:
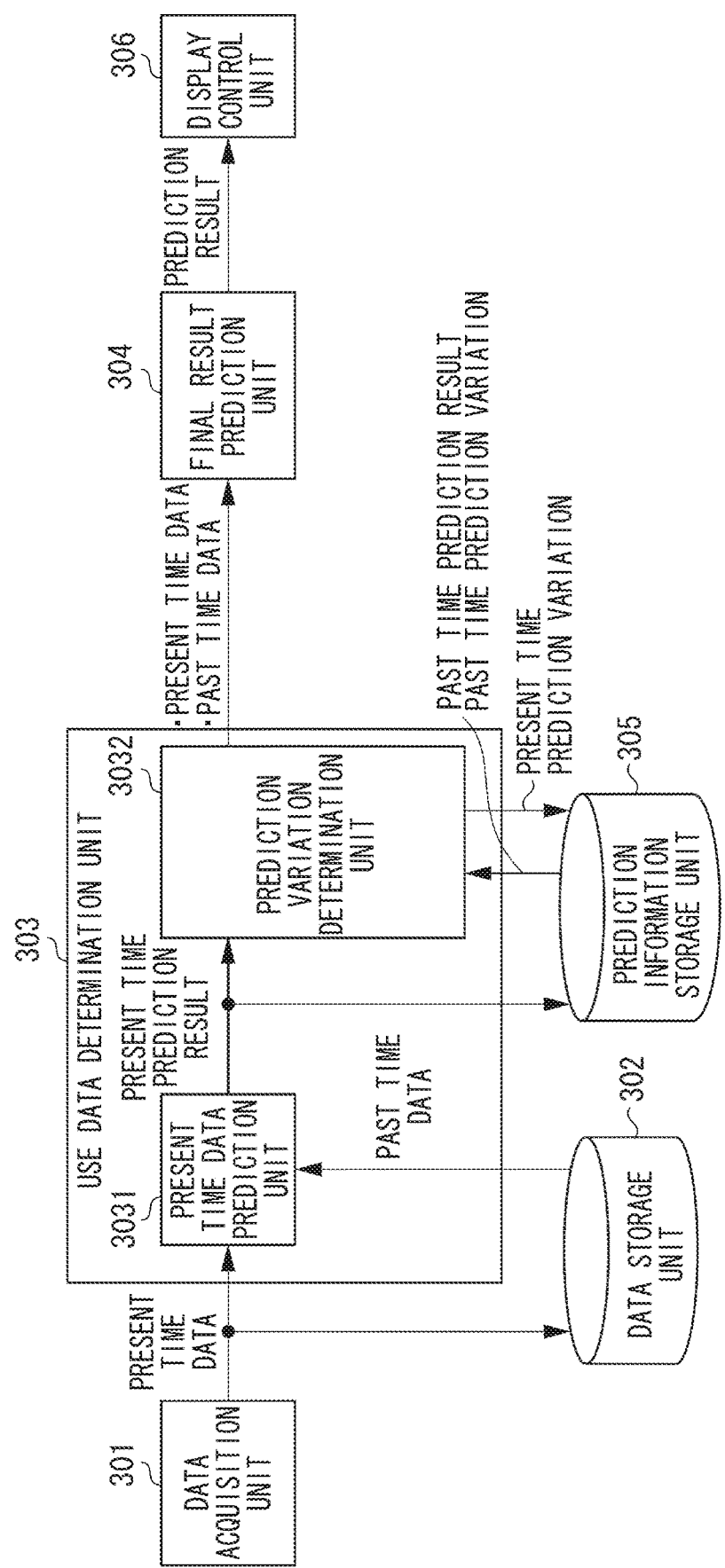
FIG. 3 is a block diagram of a prediction device according to the first exemplary embodiment.

FIG. 3 is a block diagram illustrating a software configuration of the prediction device according to the present exemplary embodiment. The prediction device illustrated in FIG. 3 includes a data acquisition unit 301 that acquires time-series data to be used in prediction and a data storage unit 302 that stores the acquired data with passage of time. Further, a use data determination unit 303 includes a present time data prediction unit 3031 and a prediction variation determination unit 3032, and determines whether present time data is used for prediction, in addition to past time data stored in the data storage unit 302. Further, the prediction device includes a final result prediction unit 304 that predicts future data from data used based on determination of the use data determination unit 303, a prediction information storage unit 305 that stores a result predicted by the final result prediction unit 304, and a display control unit 306 that controls display of the prediction result.

The prediction device of the present exemplary embodiment can be realized by execution of software (a program) acquired through a network or various recording media, by a calculator that includes a central processing unit (CPU), a memory, a storage device, an input/output device, a bus, and the like. Further, as the calculator (not illustrated), a general-purpose calculator or hardware optimally designed for the software may be used.

(Details of Processing)

Figure 4:
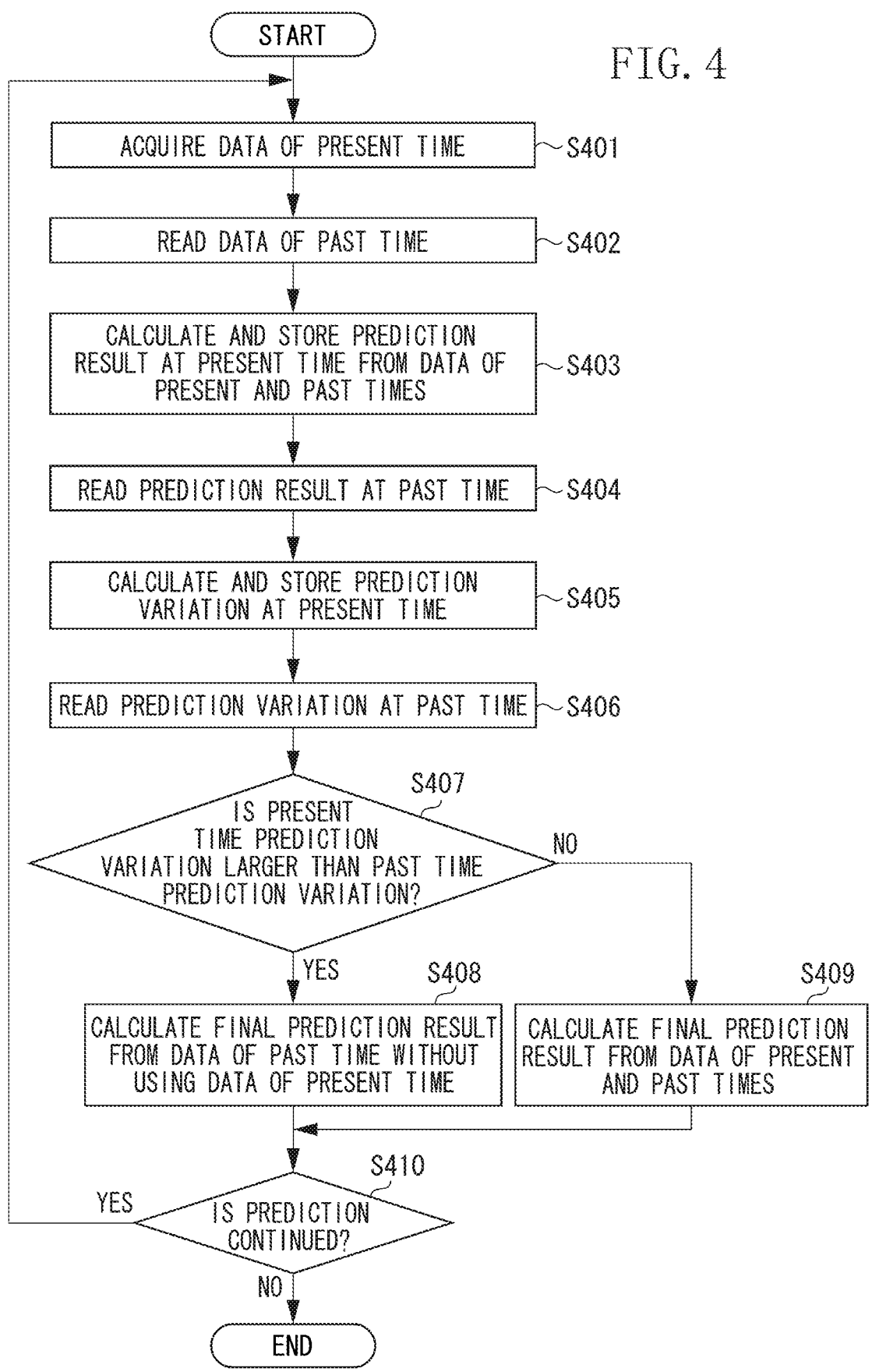
FIG. 4 is a flowchart illustrating processing of the prediction method according to the first exemplary embodiment.

FIG. 4 is a flowchart illustrating processing of the prediction method executed by the above-described prediction device of the present exemplary embodiment. First, in step S401, the data acquisition unit 301 acquires the present time data detected and output by a sensor or the like. Any form of the data can be employed as long as the data can be acquired in time series, as described above. The prediction device of the present exemplary embodiment acquires the toner remaining amount, as the time-series data, to predict the time to replace the toner of the copy machine. In the case of prediction of failure or replacement, the time-series data serves as an index that indicates the degree of consumption. The data acquired by the data acquisition unit 301 is sent to the data storage unit 302 and the use data determination unit 303.

The data storage unit 302 sequentially stores the data acquired in the data acquisition unit 301. At this time, the data storage unit 302 may store the acquired data together with time information, or may just store the acquired data in order if a time cycle to acquire the data is determined in advance. In the case of prediction of toner replacement of the copy machine, like the present exemplary embodiment, to associate the data with a use time of the copy machine, the data storage unit 302 may store the data together with the number of printed sheets after the toner is replaced. Since the data storage unit 302 sequentially stores the data, the data storage unit 302 stores not only the present time data but also the past time data. Therefore, the data storage unit 302 functions as a time-series data generation unit that sequentially stores the present time data, in addition to the past time data, and generates the time-series data.

The use data determination unit 303 includes the present time data prediction unit 3031 and the prediction variation determination unit 3032. The present time data prediction unit (present time prediction unit) 3031 receives the present time data from the data acquisition unit 301. In step S402, the present time data prediction unit 3031 reads the past time data sequentially stored by the data storage unit 302.

Then, in subsequent step S403, the present time data prediction unit 3031 calculates a present time prediction result from the present time data and the past time data. The present time prediction result is a result of a time to reach a value set in advance that is predicted with the present time, using the past time data and the present time data. In the present exemplary embodiment, a day (time) when the degree of consumption reaches the set value, and the toner remaining amount becomes 0 is predicted.

Although there are various methods for predicting the time-series data, there is a prediction method using an autoregressive model, as a representative method for predicting the time-series data. The autoregressive model uses a past value of the own time series, as an explanatory variable. A p-degree linear autoregressive model, which is the most basic autoregressive model, is expressed by the following formula 1:

$$X_t = a_0 + \Sigma_{i=1}^{p} a_i x_{t-i} + u_t$$

where the time series obtained with the time t is $x_t$.

Here, $a_0$ represents a constant term, $a_i$ represents a coefficient, and $u_t$ represents an error term. Further, it is assumed that $u_t$ follows normal distribution of an average 0 and dispersion 1. Estimation of the coefficient is performed using a Yule-Walker method. The autoregressive model is suitable for prediction when the time-series data has periodic change such as seasonal variation.

When there is little periodic change and a cause of the variation is already known, and an influence of the variation is taken into account, use of a regression analysis method is suitable. Linear regression, which is the most basic regression analysis method, is expressed by the following formula 2:

$$Y = W_0 + \sum_{j=1}^{D} W_j X_j$$

Here, $X_j$ represents an observed value, Y is a target value, $W_0$ is a constant term, and $W_j$ is a coefficient. Estimation of the coefficient is performed using a least-squares method. Considering a corresponding relationship with the time-series data, the time t corresponds to the observed value $X_j$, and the time series $x_t$ corresponds to the target value Y, where the time series obtained at the time t is $x_t$. Here, an example of linear combination has been described. However, non-linear expansion can also be performed, as stated in C. M. Bishop, "Pattern Recognition and Machine Learning". In the prediction device of the present exemplary embodiment, a prediction method is not limited to these prediction methods, and other prediction methods may be used.

The calculated present time prediction result is sent to the prediction information storage unit 305, and is also sent to the prediction variation determination unit 3032. The prediction information storage unit 305 sequentially stores the present time prediction result calculated in the present time data prediction unit 3031 every time the data is acquired in the data acquisition unit 301. Since the prediction information storage unit 305 sequentially stores the data, the prediction information storage unit 305 stores not only the data of the present time prediction result that is the prediction result in the present time, but also a past time prediction result that is a prediction result calculated in the past. As the past time prediction result recorded in the prediction information storage unit 305, a result of the final result prediction unit 304 described below may be recorded, instead of the result predicted in the present time data prediction unit 3031. In this case, the past time prediction result is data that is sequentially stored prediction results output by the prediction device of the present exemplary embodiment of the present invention.

Next, in step S404, the prediction variation determination unit 3032 reads the past time prediction result stored in the prediction information storage unit 305. The past time prediction result is the prediction result calculated in the present time data prediction unit 3031 in the past, as described in the description of the prediction information storage unit 305. Note that, in FIG. 2 described above, the past time prediction result corresponds to the data 22, and the present time prediction result corresponds to the data 23.

Following that, the processing proceeds to step S405, and the prediction variation determination unit 3032 calculates variation of the prediction in the past time and the present time, that is, present time prediction variation. This corresponds to the data 25 of FIG. 2, and can be obtained by calculation of a difference between the past time prediction result 22, and the present time prediction result 23 calculated in the present time data prediction unit 3031. The calculated present time prediction variation 25 is stored in the prediction information storage unit 305.

The prediction information storage unit 305 sequentially stores the present time prediction result sequentially calculated in the present time data prediction unit 3031, and the present time prediction variation sequentially calculated in the prediction variation determination unit 3032. The prediction information storage unit 305 stores the prediction data with passage of time, similarly to the data storage unit 302. The prediction information storage unit 305 may store the prediction data together with the time information or information like the time information, or may store the prediction data in order if a time cycle to acquire the data is determined in advance. In the prediction information storage unit 305, the present time prediction result and the present time prediction variation are sequentially stored. Therefore, not only the present time data but also the past time data is stored. For example, description is given using FIG. 2. When the present time is $t_{n-1}$, the present time prediction result is the result 23 that is prediction of the time at which the degree of consumption becomes the value $x_n$, using the data from the time $t_1$ to the time $t_{n-1}$. At this time, the past time prediction result is the results predicted as the present time prediction results in the past time, that is, the results 21 and 22 that are prediction of the time at which the degree of consumption becomes the value $x_n$, using the data from the time $t_1$ to the $t_{n-2}$ or before.

In step S406, the prediction variation determination unit 3032 reads the past time prediction variation stored in the prediction information storage unit 305. Next, the processing proceeds to step S407, the prediction variation determination unit 3032 compares magnitude $\Delta t_{n-1}$ of the present time prediction variation 25 and magnitude of the past time prediction variation by the formula 3:

$$|\Delta t_{n-1}| > t_{th}$$

$t_{th}$ is a threshold obtained from the magnitude of the past time prediction variation, and is, for example, a maximum value or an average value of the magnitude of the past time prediction variation. Further, the threshold $t_{th}$ may be a statistic such as a median or a most frequent value, or may be magnitude set based on dispersion. Which value is used may be determined based on a method in which data for learning is prepared, for example, and which statistic has often made a difference between the prediction value and the actual value small when the statistic is used as the threshold. As described above, the prediction variation determination unit 3032 functions as a comparison unit that compares the present time prediction variation and the past time prediction variation.

As another method, the magnitude of past variation is formed into a histogram, and a threshold in which a% of the entire variation is included may be set. A method for setting a is, for example, preparing the data for learning, changing the threshold according to the value of a, and calculating a difference between the prediction value and the actual value for each value of a. Then, a may just be set such that an average of absolute values of the differences becomes small in the entire data for leaning. The threshold may just be a value calculated using past time prediction variation values, and when the statistic like an average value is used, the present time prediction variation may be added to the past time prediction variation and calculation may be performed.

When the magnitude of the present time prediction variation and the magnitude of the past time prediction variation are compared, and the formula 3 is satisfied, that is, the present time prediction variation is larger than the past time prediction variation (Yes in step S407), the processing proceeds to step S408. At this time, the prediction variation determination unit 3032 sends only the past time data to the final result prediction unit 304, as the data to be used for prediction. When the formula 3 is not satisfied (No in step S407), the processing proceeds to step S409, and the prediction variation determination unit 3032 sends the past time data and the present time data to the final result prediction unit 304, as the data to be used for prediction.

When the processing proceeds to step S408, the final result prediction unit (final prediction unit) 304 calculates the prediction result only from the past time data without using the present time data. In the case of the present exemplary embodiment, the time at which the toner remaining amount becomes 0 is predicted as the prediction of the toner replacement of the copy machine. A prediction method is similar to the prediction method by the present time data prediction unit 3031, and a different point is not using the present time data. Meanwhile, when the processing proceeds to step S409, the final result prediction unit 304 calculates the prediction result, using both of the present time data and the past time data. A prediction method is similar to the prediction method by the present time data prediction unit 3031. Therefore, the final result prediction unit 304 may call the prediction result calculated and stored based on the present time data and the past time data in step S403 and output the called prediction result as the prediction result, without performing the prediction processing in step S409. The prediction result calculated by the final result prediction unit 304 in step S408 or S409 is sent to the display control unit 306.

The display control unit 306 performs control of displaying the prediction result in a display unit such as a display. The display unit may be integrally configured with the prediction device of the present exemplary embodiment, or may be separately configured from the prediction device and connected by a display cable or a network. FIGS. 5A to 5C are diagrams illustrating examples in which the prediction results are made into a graph with the time-series data and displayed. The example of FIG. 5A displays past prediction results 501 and a final prediction result 502 together.

Further, the example of FIG. 5B displays a range 511 of the prediction results predicted in the past, by arrows in a final prediction result 512. At this time, all of the past prediction results may be used, or only a several number of times of the past results may be used. Further, a color of a range in which frequency of prediction is high may be changed and displayed. Further, the example of FIG. 5C displays the prediction result with a bar 521. For example, by indication of a probability of prediction with a color, the probability of which time the prediction is performed can be easily visually displayed. Here, the method for displaying the prediction results with a graph has been described. However, the prediction results are not necessarily made into a graph, and may be displayed in a manner where a table format using the bar 521 is employed, and each column represents a time of prediction, and the probability can be visually recognized with a color, for example.

Finally, the processing proceeds to step S410 and the processing is terminated, or the processing returns to step S401 to continuously acquire data to perform prediction and repeats the processing up to step S409. In the present exemplary embodiment, the present time data determined not to be used in step S407 is used as the past time data in a series of prediction processing flows of the next time, the prediction result at the present time is calculated in step S403, and the final prediction result is calculated in step S408 or S409.

An exemplary embodiment of displaying the prediction result to the user by the display control unit 306 has been described as the method for using the prediction result of the prediction device of the present exemplary embodiment of the present invention. The method for using the prediction result is not limited to the exemplary embodiment, and can be used for other uses. For example, when a consumable such as the toner is predicted to reach the end of life within a predetermined period, based on the prediction result of the present exemplary embodiment of the present invention, the information is transmitted to a stock control system, and adjustment of stock (order for equipment) can be requested. Further, for example, the prediction result is transmitted to a visit plan management system of a service person, and the prediction result may be used for creation of a visit plan of the service person. As an example of the creation of a visit plan using the prediction result, a visit plan can be created, which prompts the service person to visit a copy machine that is approaching the end of life within a predetermined period, and decreases a priority to visit a copy machine that have time to reach the end of life.

As described above, according to the first exemplary embodiment of the present invention, when the future data is predicted using the time-series data, whether using the present time data is determined based on the magnitude of the prediction variation, and then the prediction of the future data is performed. Therefore, the prediction of data can be performed with high precision. Further, the present time data determined not to be used because the prediction variation is large is used as the past time-series data in the subsequent prediction. Therefore, even when the number of pieces of time-series data is small, the prediction of the future data can be performed with high precision.

(Outline)

Next, an exemplary embodiment of determining whether prediction variation of a present time falls within an allowable range, based on past prediction variation, and calculating a prediction result, using present time data and past time data when the prediction variation falls within the allowable range will be described as a second exemplary embodiment of the present invention. The present exemplary embodiment focuses on a transition of variation of prediction, and predicts a time [$t_n$] at which the degree of consumption would become a value $x_n$ set in advance, when time-series data is provided, and predicting a future value, using data from a time $t_1$ to a time $t_{n-1}$.

Figure 6A:
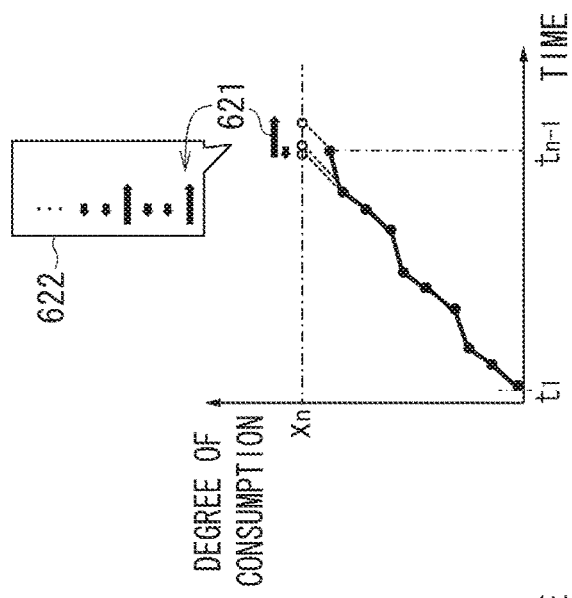
FIGS. 6A to 6C are diagrams for describing an outline of a prediction method according to a second exemplary embodiment.
Figure 6B:
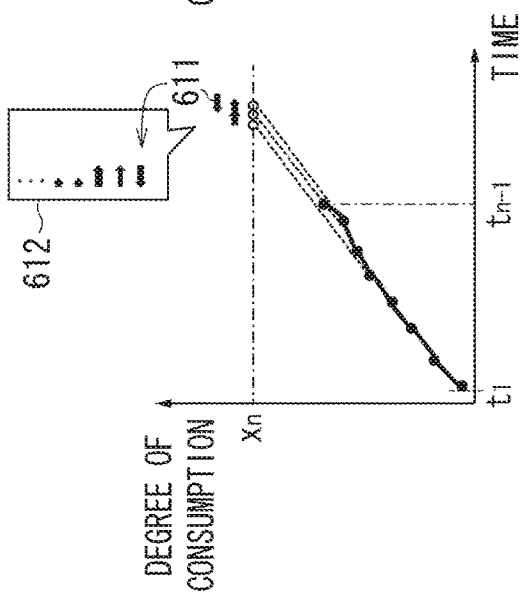
Figure 6C:
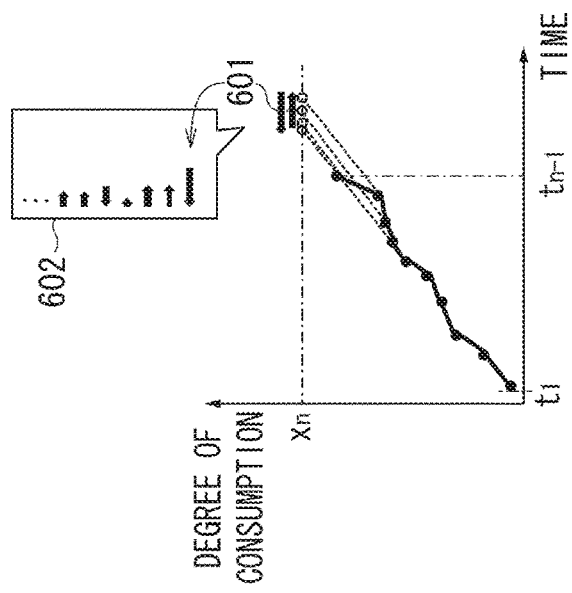

FIGS. 6A to 6C are diagrams for describing an outline of a prediction method of the present exemplary embodiment. In FIG. 6A, prediction variation 601 indicates a difference between prediction of a time [$t_n$] at which the degree of consumption would become a value $x_n$, using data from a time $t_1$ to a time $t_{n-1}$, and prediction similarly performed using data from the time $t_1$ to before the time $t_{n-1}$. A transition 602 indicates a transition of past accumulation of differences that are similarly calculated, that is, a transition of variation of past prediction. Similarly, in FIG. 6B (FIG. 6C), prediction variation 611 or 621 indicates past prediction variation, and a transition 612 or 622 indicates a transition of the past prediction variation. The prediction method of the present exemplary embodiment determines whether the prediction variation 601 of the present time is appropriate based on the transition 602 of the past prediction variation, and determining whether using the data of the time $t_{n-1}$ for prediction.

A prediction device according to the present exemplary embodiment has a configuration similar to that of the prediction device of the first exemplary embodiment. Therefore, in the description below, the same configuration is denoted with the same reference sign, and description is omitted.

(Details of Processing)

Figure 7:
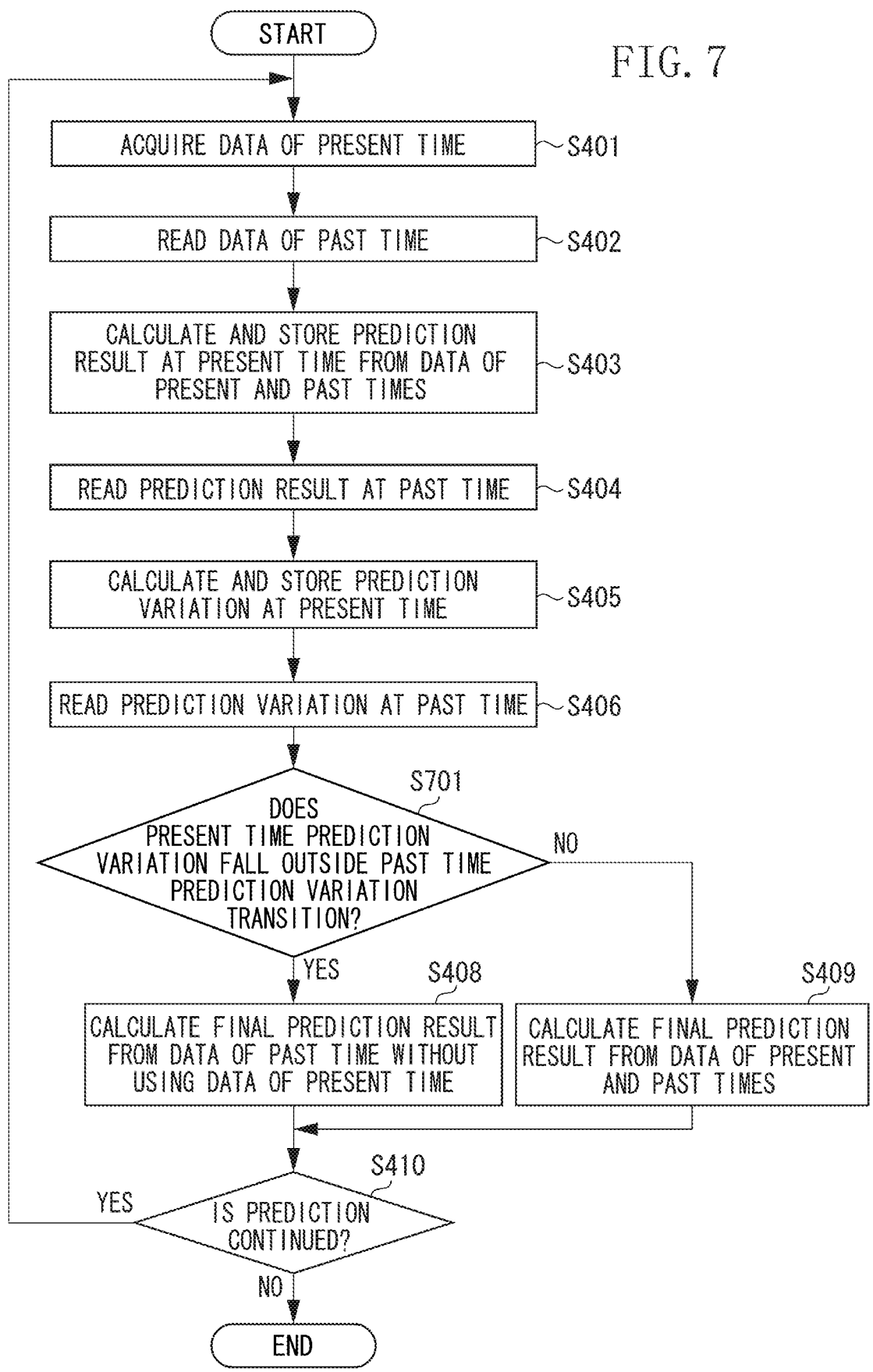
FIG. 7 is a flowchart illustrating processing of the prediction method according to the second exemplary embodiment.

FIG. 7 is a flowchart illustrating processing of the prediction method executed by the prediction device of the present exemplary embodiment. A difference from the processing flow of the first exemplary embodiment is to perform step S701 in place of step S407. Therefore, here, processing of step S701 will be mainly described.

In step S701, a prediction variation determination unit 3032 determines whether the present time prediction variation falls outside an allowable range, based on the transition of the past time prediction variation. Description of the transition of the prediction variation is first given. In the present exemplary embodiment, in step S403, the prediction time [$t_n$] at which the degree of consumption would become the value $x_n$ set in advance is sequentially updated every time a data acquisition unit 301 acquires data in step S401 of FIG. 7. In conjunction with that, the prediction variation (present time prediction variation) of that time is calculated and updated in step S405. A transition of variation of the prediction time [$t_n$] sequentially updated in this way is the transition of the prediction variation.

Hereinafter, a method for determining whether the present time prediction variation falls within the allowable range, based on the transition of the past prediction variation, in the prediction variation determination unit 3032 of the present exemplary embodiment will be described with reference to FIGS. 6A to 6C. First, when the transition of the past prediction variation relatively randomly occurs, as illustrated in FIG. 6A, and the present time prediction variation is expressed as $\Delta t_{n-1}$, and the prediction variation before that is expressed as $\Delta t_{n-2}$, $\Delta t_{n-3}$, and $\Delta t_{n-4}$, determination is made as follows. In the present exemplary embodiment, even if $|\Delta t_{n-1}|$ is larger than the magnitude of the prediction variation so far, the determination is not made only with the magnitude of the prediction variation of the present time one time, and the determination is made with the transition so far. To be specific, the prediction variation determination unit 3032 uses the following formula 4. When the formula 4 is satisfied, the prediction variation determination unit 3032 determines that the present time prediction variation falls within the allowable range in the light of the transition so far, although the present time prediction variation is large as the prediction variation of one time. Then, in step S409, a final prediction result is obtained based on both of the present time data and the past time data.

$$|\Delta t_{n-4}+\Delta t_{n-3}+\Delta t_{n-2}|<|\Delta t_{n-1}|$$

Next, FIG. 6B illustrates a case in which the past time prediction variation is a certain value or less on a constant basis. For example, if the present time prediction variation 611 is $\Delta t_{n-1}>0$ when the past prediction variation transition 612 is always $\Delta t_{n-1}<0$, the prediction variation determination unit 3032 determines that the present time transition is an abnormal transition, and the present time prediction variation falls outside the allowable range. Then, in step S408, the data of the present time $t_{n-1}$ is determined not to be used, based on the determination result, and the final prediction result is calculated based only on the past time data. When the past prediction variation is always a certain value or more, and the present time prediction variation is a certain value or less, similar determination is made.

Further, determination processing of when the prediction variation performs periodic movement will be described with reference to FIG. 6C. For example, assume that the present time prediction variation 621 is large prediction variation. However, when similar variation periodically occurs in the past prediction variation transition 622, the prediction variation determination unit 3032 determines that the present time prediction variation falls within the allowable range from the past prediction variation transition.

To be specific, for example, the prediction variation is expressed as $x_i$, and the transitions of the prediction variation of a past certain portion have been performed when i=b, b+1, and b+2, and the transitions of the prediction variation around the present time have been performed when i=t−3, t−2, and t−1. Then, to determine whether the prediction variation transition looks similar to these past prediction variation, a distance d is calculated using the following formula 5:

$$d = \sum_{j=1}^{3} (x_{b-1+j} - x_{t-4+j})^2$$

If the distance d is a set threshold or less, the prediction variation determination unit 3032 determines that similar variation has periodically occurred in the past, and the prediction variation transition looks like the past prediction variation transition, and the present time prediction variation falls within the allowable range. As the threshold, for example, data for leaning is prepared, a value between a true value of data to be predicted and the prediction value, and an index value of that time are calculated, and the index value that falls within the allowable difference can be employed.

As described above, in the present exemplary embodiment, in step S701, the prediction variation determination unit 3032 determines whether the present time prediction variation falls within the allowable range, based on the past time prediction variation transition. When the present time prediction variation falls outside the allowable range (Yes in step S701), the processing proceeds to step S408, a final result prediction unit 304 calculates the prediction result only from the past time data. When the present time prediction variation falls within the allowable range (No in step S701), the processing proceeds to step S409, the final result prediction unit 304 calculates the prediction result, using both of the present time data and the past time data.

In the above description, an example of determining whether the present time prediction variation falls within the allowable range, based on the different determination criteria (formulas), after the past prediction variation transition is divided into the three patterns of FIGS. 6A to 6C has been described. However, whether the present time prediction variation falls within the allowable range may be determined based on one determined criterion (formula) or a plurality of determined determination criteria (formulas) without dividing the past prediction variation transition into patterns. Further, whether the present time prediction variation falls within the allowable range can be determined using another determination criterion (formula) from the aforementioned criteria.

Further, in step S701 of FIG. 7, even when the present time data is determined not to be used, in the series of prediction processing flows of the next time, the data is used as the past time data, and the final prediction result is calculated in step S408 or S409. Therefore, in the present exemplary embodiment, the prediction of the future data can be performed with high precision even when the number of pieces of the time-series data is small.

According to the second exemplary embodiment of the present invention, when the future data is predicted using the time-series data, the prediction of the future data is performed after whether using the present time data is determined based on the past prediction variation transition. Therefore, the prediction of the future data can be performed with high precision.

As described above, the first and second exemplary embodiments perform the prediction of the future data, based on the prediction variation in the present time and the prediction variation in the past time. Here, the prediction variation in the present time is the difference between the present time prediction result and the past prediction result, and the prediction variation in the past time is the difference between the past prediction results. That is, if the former difference is expressed as first difference, and the latter difference is expressed as second difference, the first and second exemplary embodiments of the present invention perform the prediction of the future data after whether using the present time data is determined based on the first difference and the second difference.

(Outline)

Next, an exemplary embodiment of determining whether to use present time data, based on data transition of time-series data in a past time, or data transition of time-series data in another machine number, will be described as a third exemplary embodiment of the present invention. The present exemplary embodiment focuses on a transition of data and predicts a time $[t_n]$ at which the degree of consumption would become a value $x_n$ set in advance, when the time-series data is provided, and predicting a future value, using data from a time $t_1$ to a time $t_{n-1}$.

Figure 8:
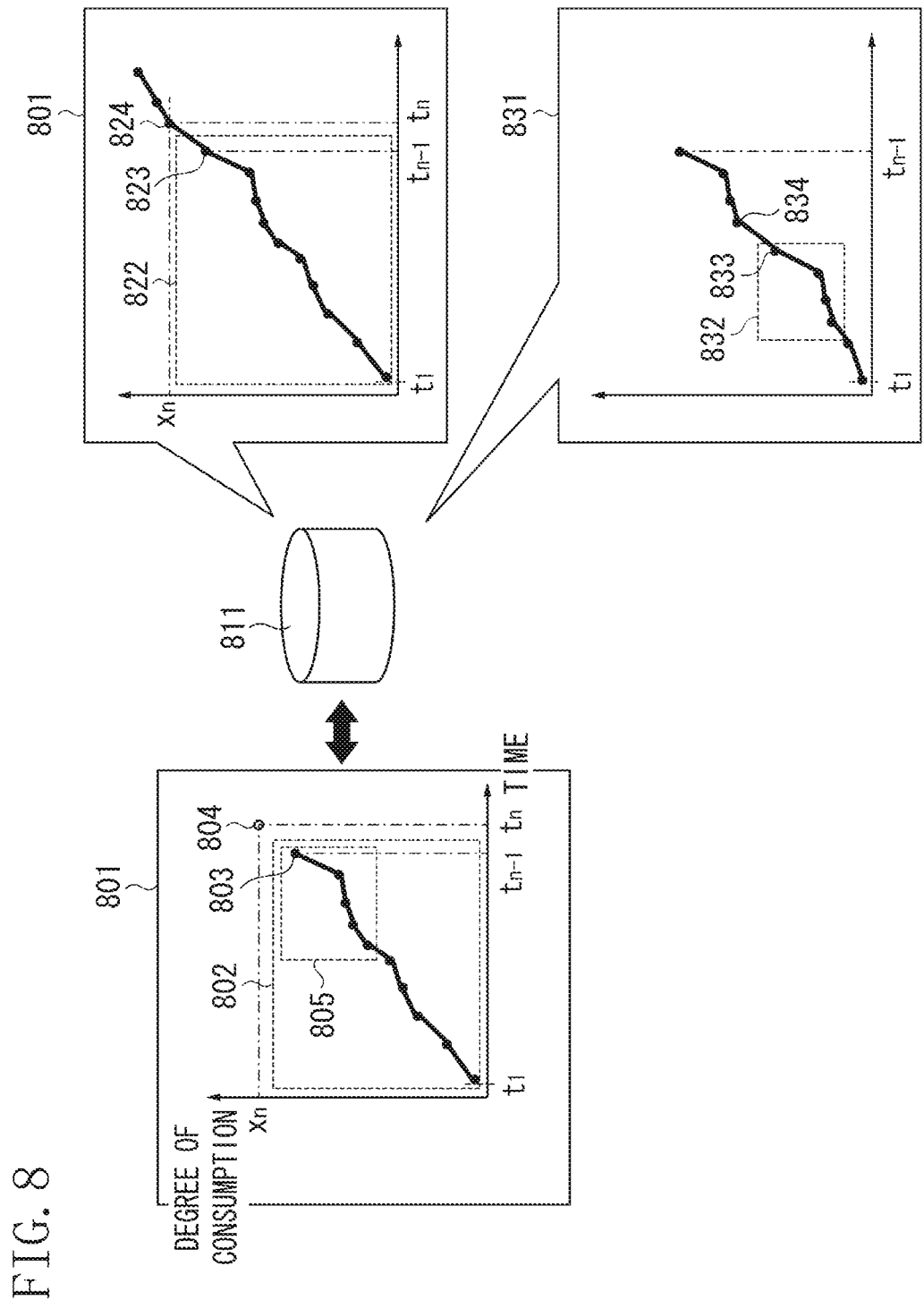
FIG. 8 is a diagram illustrating an outline of a prediction method according to a third exemplary embodiment.

FIG. 8 is a diagram for describing an outline of a prediction method of the present exemplary embodiment. FIG. 8 illustrates a data transition 802 and a transition 805 that is a part of the data transition 802 in time-series data 801 presently acquired by processing of the prediction method of the present exemplary embodiment. Further, FIG. 8 illustrates data 803 of a present time $t_{n-1}$, and prediction of data 804 is performed based on the data 803. At that time, data transition similar to the data transitions 802 and 805 is detected from past time-series data 821, or detected from time-series data 831 in a copy machine of another machine number. Whether the data of the time $t_{n-1}$ is used for prediction is determined using a data transition 822 of the time-series data 821 in the past time or a data transition 832 of the time-series data 831 in the another machine number, which has been detected as described above.

(Configuration)

Figure 9:
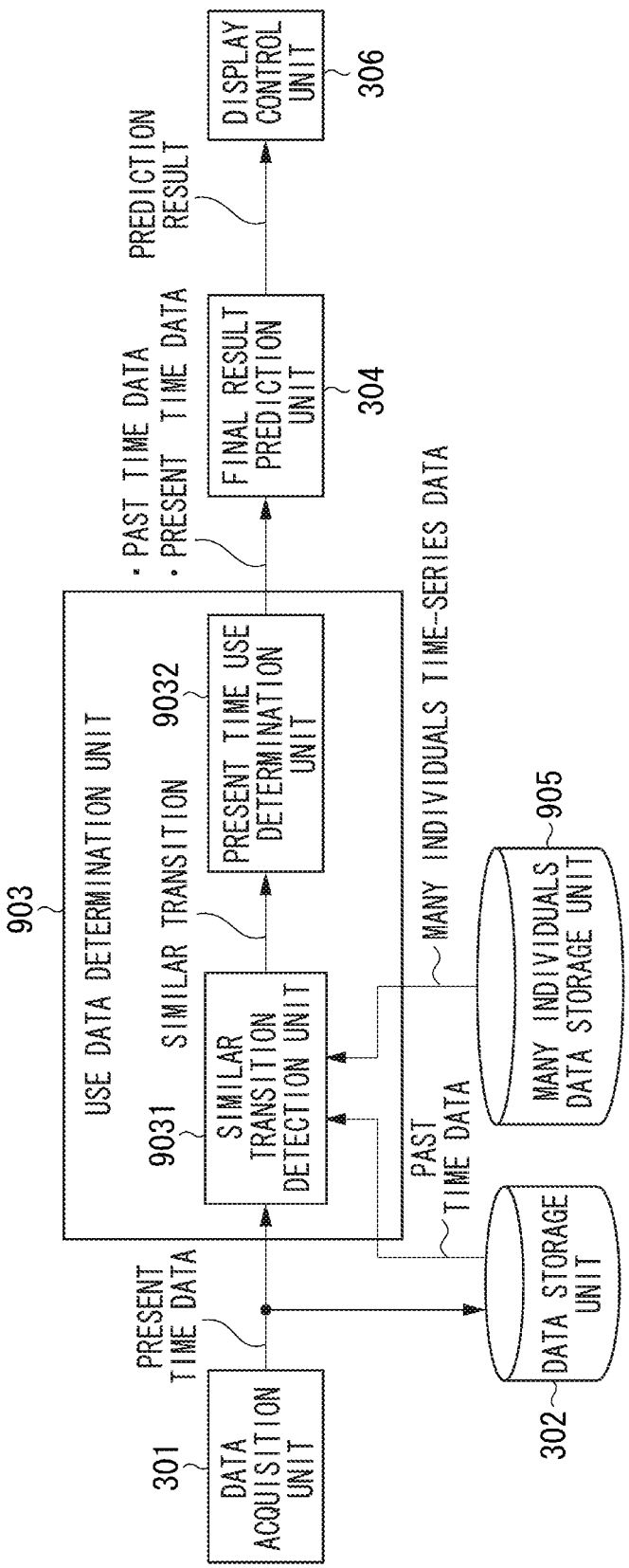
FIG. 9 is a block diagram of a prediction device according to the third exemplary embodiment.

FIG. 9 is a block diagram illustrating a software configuration of a prediction device according to the present exemplary embodiment. The configurations already described in the first and second exemplary embodiments will be denoted with the same reference signs, and description thereof is omitted. The prediction device illustrated in FIG. 9 includes a data acquisition unit 301, a data storage unit 302, a use data determination unit 903, a final result prediction unit 304, and a many individuals data storage unit 905. Further, the use data determination unit 903 includes a similar transition detection unit 9031 and a present time use determination unit 9032.

The many individuals data storage unit 905 stores the time-series data of various individuals. That is, in an example of prediction of toner replacement of a copy machine, like the present exemplary embodiment, the many individuals data storage unit 905 stores the time-series data of not only a target machine number, but also many other machine numbers. While the data storage unit 302 stores the time-series data of a target machine number, the many individuals data storage unit 905 stores data of many other machine numbers. The many individuals data storage unit 905 may store the time-series data together with time information or information similar to the time information, or may store the time-series data in order if a time cycle to acquire the data is determined in advance, similarly to the data storage unit 302.

(Details of Processing)

Figure 10:
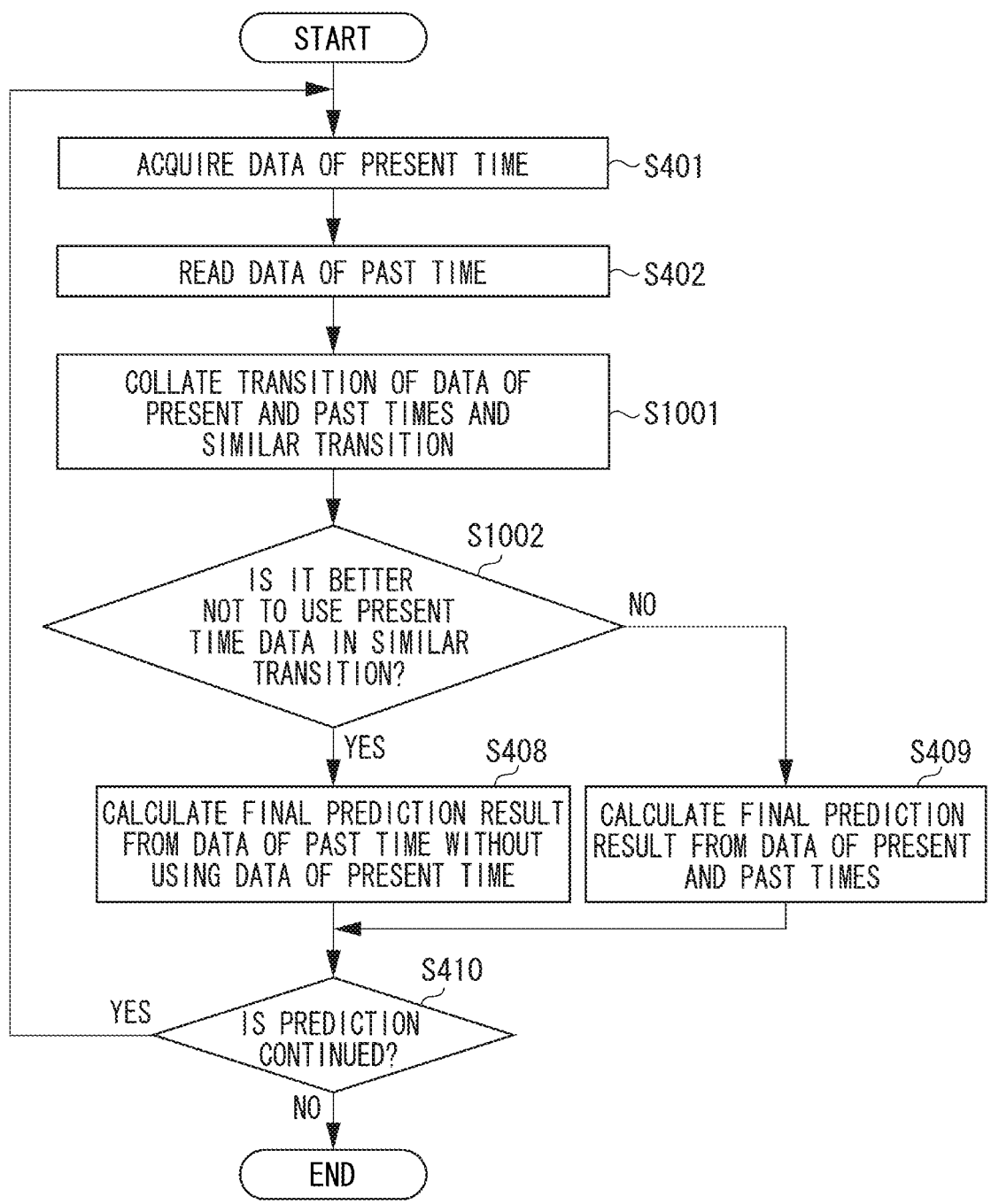
FIG. 10 is a flowchart illustrating processing of the prediction method according to the third exemplary embodiment.

FIG. 10 is a flowchart illustrating processing of the prediction method executed by the prediction device of the present exemplary embodiment. A difference from the processing flow of the first exemplary embodiment is to perform steps S1001 and S1002, in place of steps S403 to S407. Therefore, here, the processing of steps S1001 and S1002 will be mainly described.

In step S1001, the similar transition detection unit 9031 acquires present time data from the data acquisition unit 301, and reads past time data from the data storage unit 302. The similar transition detection unit 9031 then collates a data transition of a part of the time-series data stored in the data storage unit 302 with a data transition in the past time of another machine number stored in the many individuals data storage unit 905.

As a method for collating the data transitions, various methods are applicable to the present exemplary embodiment. However, as the simplest method, there is a method for calculating a distance. First, target data is acquired at the same time interval, and the degree of consumption of toner of this time is defined as $x_i$ (i=1, 2, 3, . . . , n). This is a target data transition. Meanwhile, a plurality of data transitions having the same length is acquired at the same time interval from the time-series data to be collated. That is, for example, $y_i$ (i=1, 2, 3, . . . , n). Then, a distance d' is calculated from the following formula 6, and a data transition having the calculated distance d' that is the closest is selected as the similar data transition.

$$d' = \sum_{i=1}^{n} (x_i - y_i)^2$$

Further, as another method, there is a method for calculating a correlation coefficient c. The correlation coefficient of two sets of numerical strings of $x_i$ and $y_i$ is calculated from the formula 7. The calculated correlation coefficient c exhibits a less correlation as the coefficient is closer to 0, and exhibits a strong correlation as an absolute value is closer to 1. Therefore, by use of such the correlation coefficient, a data transition having the strongest correlation can be detected.

$$c = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

There are various methods for collating the data transition, and the prediction device of the present exemplary embodiment is not limited to use of a specific collation method. Further, in the above description, the collation with the many individuals data storage unit 905 has been described. However, a similar data transition may be detected from the past data transitions in the own machine number, using the past data transitions stored in the data storage unit 302. Further, the data transition may be collated with both of the time-series data of the another machine number of the many individuals data storage unit 905 and the past time-series data in the own machine number stored in the data storage unit 302. Then, the similar data transition detected by the similar transition detection unit 9031 in this way is sent to the present time use determination unit 9032.

Next, in step S1002, the present time use determination unit 9032 determines whether to use the present time data, based on the similar data transition detected by the similar transition detection unit 9031. Here, for example, as illustrated in FIG. 8, assume that the data transition 802 and the data transition 822 in the past time-series data 821, as a data transition similar to the data transition 802, have been detected by the processing of the prediction method of the present exemplary embodiment. Further, the data 823 of the detected similar data transition 822 corresponds to the present time data. In the present exemplary embodiment, whether a result with higher precision has been obtained if the data 824 is predicted using the data 823 or if the data 824 is predicted without using the data 823, in the similar data transition 822 that is the data transition occurred in the past, is determined. That is, it is determined which of cases has provided a value closer to the true value $t_n$, between the case of predicting the time [$t_n$] from the data of the time $t_{n-2}$ or before, and the case of predicting the time [$t_n$], using the data of the time $t_{n-1}$, in addition to the data of the time $t_{n-2}$ or before, in the data transition 822. If the time is closer to the true value without the use of the data of the time $t_{n-1}$, it is determined that the present time data 80 is preferably not used in the time-series data 801 that is being presently processed. Meanwhile, if the time is closer to the true value with the use of the data of the time $t_{n-1}$, it is determined that the present time data 803 is preferably used. When the future data 824 is predicted using the data 823 in the past time-series data 821, the prediction may just be similarly performed by the above-described method. As described above, the present time use determination unit 9032 functions as a transition determination unit that determines whether to use the present time data, based on the similar data transition.

Collation with the data transition in the past time of the another machine number stored in the many individuals data storage unit 905 can be similarly processed. Whether a result with higher precision has been obtained if the data 834 is predicted using the data 833, than if the data 834 is predicted without using the data 833, in the data transition 832 detected by the many individuals data storage unit 905, as the transition similar to the data transition 805 of a part of the time-series data 801 that is being presently acquired, is determined. Then, whether to use the present time data 803 is determined based on a determination result.

In the above description, a configuration of selecting only one similar data transition has been described. However, it is not necessary to select only one. A plurality of data transitions close to the data transition of the time-series data to be processed may be selected. When a plurality of similar data transitions has been detected by the similar transition detection unit 9031, determination of whether the precision is better if the present time data is used is performed with respect to each of the similar data transitions. Then, whether to use the present time data is finally determined based on a plurality of determination results. For example, a determination result may be made by majority vote, or may be made by application of a weight to each of the similar data transitions, according to the degree of similarity. A method for performing final use determination of the present time data based on the plurality of similar data transitions may be another method, and is not limited to the method described here.

In this way, in step S1002, the present time use determination unit 9032 determines whether to use the present time data, based on the detected similar data transition. Then, the data to be used in the prediction is sent to the final result prediction unit 304, according to the determination result. When the present time data is not used (Yes in step S1002), the processing proceeds to step S408, and the final result prediction unit 304 calculates the prediction result only from the past time data without using the present time data. Meanwhile, when the present time data is used (No in step S1002), the processing proceeds to step S409, and the final result prediction unit 304 calculates the prediction result, using both of the present time data and the past time data.

In step S1002 of FIG. 10, even when the present time data is determined not to be used, the data is used as the past time data in the series of prediction processing flows of the next time, and the final prediction result is calculated in step S408 or S409. Therefore, in the present exemplary embodiment, the prediction of the future data can be performed with high precision even if the number of pieces of time-series data is small.

A configuration of using the acquired similar data transition for the use determination of the present time data has been described. However, a model suitable for the prediction may be selected from the past time-series data or the time-series data of another machine number, and used at the time of the prediction, in addition to the use determination. Further, when an application target is weather, for example, which is not an object, what are stored in the many individuals data storage unit 905 is the time-series data of many regions, and is not necessarily data of an individual.

According to the third exemplary embodiment of the present invention, whether to use the present time data is determined based on at least one of the data transition in the past time-series data and the data transition of the time-series data of the another machine number, when the future data is predicted using the time-series data. Accordingly, the prediction of the future data can be performed with high precision.

As described above, the first to third exemplary embodiments have a common configuration of having the acquired present time data as the past time data with passage of time, and using the past time data in the prediction of the future data. With this configuration, even if the number of pieces of time-series data is small, the prediction of the future data can be performed with high precision. Therefore, for example, in the first and second exemplary embodiments, whether to use the present time data is determined based on the present time prediction variation and the past time prediction variation, and the prediction of the future data is performed. Further, in the third exemplary embodiment, whether to use the present time data is determined based on the similar data transition, and the prediction of the future data is performed. However, as a method for determining whether to use the present time data, a method other than the methods described in the exemplary embodiments may be used, in the prediction of the future data. That is, a similar effect can be exerted even if whether a certain predetermined condition is satisfied is determined and the prediction of the future data is performed based on the determination result, as long as acquired present time data is considered as the past time data with passage of time, and the data is used in the prediction of the future data.

In the first to third exemplary embodiments, even if the present time data is an outlier value, the present time data is used in the prediction of the future data without any exception when the present time data becomes the past time data. However, the present invention is not limited to this configuration. For example, when the present time data is an outlier value, but the value is within a predetermined range close to a normal data range, the data is used in the prediction of the future data when the data becomes the past time data. Meanwhile, when the present time data is an outlier value, and the value does not fall within the predetermined range, the data is not used in the prediction of the future data even when the data becomes the past time data. That is, only the present time data close to the normal data range may be used in the future prediction, and the present time data that substantially falls outside the range may not be used in the future prediction. According to this configuration, the prediction of the future data with higher precision can be performed.

Other Exemplary Embodiment

In FIG. 3, the data storage unit 302 and the prediction information storage unit 305 are separated, and in FIG. 9, the data storage unit 302 and the many individuals data storage unit 905 are separated. However, it is not necessarily separate these units, and a storage unit that collectively sequentially store the data may be employed. The storage unit 811 of FIG. 8 is illustrated as an integrated unit of the data storage unit 302 and the many individuals data storage unit 905. Further, the storage units such as the data storage unit 302, the prediction information storage unit 305, and the many individuals data storage unit 905 are included in the prediction device. However, a configuration in which a recording unit is separately provided from the prediction device, and is connected by means such as a network may be employed. When the data storage unit 302 is separately provided from the prediction device, a storage unit (a hard disk drive (HDD), a memory, or the like) for storing data is provided outside the device, and a function of a data generation unit that causes the data to be sequentially stored in the storage unit and generates the time-series data remains inside the device.

According to the above configurations, the present invention enables highly precise prediction of the future data even when the number of pieces of the time-series data is small.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242460, filed Nov. 28, 2014, which is hereby incorporated by reference herein in its entirety.

What is claimed is:

1. A prediction device comprising:
one or more processors; and
a memory having instructions stored thereon which, when executed by the one or more processors, cause the device to:
acquire present time data;
generate time-series data from the data acquired at a plurality of times;
calculate a prediction result in a present time from the present time data and the past time data;
determine whether the generated time-series data satisfies a predetermined condition based on a first difference between a prediction result calculated in the present time and a prediction result in a past time calculated in a past, and a second difference between the prediction results in past times calculated in the past; and
predict future data, based on past time data without using the present time data, when the predetermined condition is determined to be satisfied, and to predict the future data, based on the present time data and the past time data, when the predetermined condition is determined not to be satisfied, wherein past time data is previously acquired present time data which has been acquired prior to the present time data.

2. The prediction device according to claim 1, wherein, when the predetermined condition is determined not to be satisfied use, as past time data, previously acquired present time data that falls within a predetermined range.

3. The prediction device according to claim 1, wherein execution of the instructions by the one or more processors cause the device to: determine the predetermined condition is satisfied when the first difference is larger than the second difference.

4. The prediction device according to claim 1, wherein execution of the instructions by the one or more processors cause the device to: determine whether the predetermined condition is satisfied based on the first difference, and a statistic of a plurality of the second differences.

5. The prediction device according to claim 4, wherein the statistic is any of a maximum value, an average value, a median, and a most frequent value.

6. The prediction device according to claim 1, wherein the future data is data about a degree of consumption, a degree of deterioration, or a possibility of occurrence of failure, of a component that configures a product.

7. The prediction device according to claim 1, wherein whether the time-series data satisfies the predetermined condition is determined, based on the first difference, and a transition of a plurality of the second differences.

8. A prediction device comprising:
one or more processors; and
a memory having instructions stored thereon which, when executed by the one or more processors, cause the device to:
acquire present time data;
generate time-series data from the data acquired at a plurality of times;
calculate a prediction result in a present time from the present die data and the past time data;
detect a transition of data similar to a transition of a part of the time-series data from past time-series data; and
determine whether the generated time-series data satisfies a predetermined condition based on the detected similar transition of data; and
predict future data, a based on past time data without using the present time data, when the predetermined condition is determined to be satisfied, and to predict the future data, based on the present time data and the past time data, when the predetermined condition is determined not to be satisfied,
wherein past time data is previously acquired present time data which has been acquired prior to the present time data.

9. The prediction device according to claim 8, wherein
the past time-series data is obtained from time-series data of another machine number.

10. The prediction device according to claim 8, wherein execution of the instructions by the one or more processors cause the device to: detect a plurality of the similar transitions of data, and
determine whether the predetermined condition is satisfied based on the plurality of similar transitions of data.

11. The prediction device according to claim 8, wherein execution of the instructions by the one or more processors cause the device to:
determine whether the predetermined condition is satisfied based on the plurality of weighted similar transitions of data.

12. A prediction method comprising:
acquiring present time data;
generating time-series data from the data acquired at a plurality of times;
calculate a prediction result in a present time from the present time data and the past time data;
determining whether the generated time-series data satisfies a predetermined condition based on a first difference between a prediction result calculated in the present time and a prediction result in a past time calculated in a past, and a second difference between the prediction results in past times calculated in the past; and
predicting future data, based on past time data without using the present time data, when the predetermined condition is determined to be satisfied, and predicting the future data, based on the present time data and the past time data, when the predetermined condition is determined not to be satisfied,
wherein past time data is previously acquired present time data which has been acquired prior to the present time data.

13. A non-transitory computer-readable recording medium that stores a program for causing a computer to function as a prediction device configured to:
acquire present time data;
generate time-series data from the data acquired at a plurality of times;
calculate a prediction result in a present time from the present time data and the past time data;
determine whether the generated time-series data satisfies a predetermined condition based on a first difference between a prediction result calculated in the present time and a prediction result in a past time calculated in a past, and a second difference between the prediction results in past times calculated in the past; and
predict future data, based on past time data without using the present time data, when the predetermined condition is determined to be satisfied, and to predict the future data, based on the present time data and the past time data, when the predetermined condition is determined not to be satisfied,
wherein past time data is previously acquired present time data which has been acquired prior to the present time data.

14. A prediction method comprising:
acquiring present time data;
generating time-series data from the data acquired at a plurality of times;
calculating a prediction result in a present time from the present time data and the past time data;
detecting a transition of data similar to a transition of a part of the time-series data from past time-series data; and determining whether the generated time-series data satisfies a predetermined condition based on the detected similar transition of data; and predicting future data, based on past time data without using the present time data, when the predetermined condition is determined to be satisfied, and to predict the future data, based on the present time data and the past time data, when the predetermined condition is determined not to be satisfied, wherein past time data is previously acquired present time data which has been acquired prior to the present time data.

15. A non-transitory computer-readable recording medium that stores a program for causing a computer to function as a prediction device configured to:

acquire present time data;

generate time-series data from the data acquired at a plurality of times;

calculate a prediction result in a present time from the present time data and the past time data;

detect a transition of data similar to a transition of a part of the time-series data from past time-series data; and determine whether the generated time-series data satisfies a predetermined condition based on the detected similar transition of data; and predict future data, based on past time data without using the present time data, when the predetermined condition is determined to be satisfied, and to predict the future data, based on the present time data and the past time data, when the predetermined condition is determined not to be satisfied, wherein past time data is previously acquired present time data which has been acquired prior to the present time data.

* * * * *